US007749701B2

(12) United States Patent
Leproust et al.

(10) Patent No.: US 7,749,701 B2
(45) Date of Patent: Jul. 6, 2010

(54) CONTROLLING USE OF OLIGONUCLEOTIDE SEQUENCES RELEASED FROM ARRAYS

(75) Inventors: Eric M Leproust, San Jose, CA (US); Michael G. Booth, Boulder Creek, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 188 days.

(21) Appl. No.: 11/203,328

(22) Filed: Aug. 11, 2005

(65) Prior Publication Data

US 2007/0037175 A1    Feb. 15, 2007

(51) Int. Cl.
*C12Q 1/68* (2006.01)
*C07H 21/02* (2006.01)
*C07H 21/04* (2006.01)

(52) U.S. Cl. .................. 435/6; 435/287.2; 536/23.1; 536/24.2; 536/25.3

(58) Field of Classification Search .............. 435/6, 435/287.2; 536/23.1, 24.2, 25.3
See application file for complete search history.

(56) References Cited

U.S. PATENT DOCUMENTS

| | | | | |
|---|---|---|---|---|
| 5,830,655 | A * | 11/1998 | Monforte et al. | 435/6 |
| 5,843,655 | A * | 12/1998 | McGall | 506/16 |
| 5,932,711 | A * | 8/1999 | Boles et al. | 536/22.1 |
| 6,284,503 | B1 * | 9/2001 | Caldwell et al. | 435/181 |
| 6,368,834 | B1 * | 4/2002 | Senapathy et al. | 435/91.1 |
| 6,844,151 | B1 * | 1/2005 | Dale | 435/6 |
| 7,045,609 | B2 * | 5/2006 | Metelev et al. | 536/22.1 |
| 2005/0164207 | A1 * | 7/2005 | Shapero | 435/6 |

OTHER PUBLICATIONS

RECJf, New Englnd BioLabs Inc., Product datasheet.*
Nikiforov et al, The use of phosphorthioate primers and exonuclease hydrolysis for the preparation of single stranded PCR products and their detection by solid phase hybridization, 1994, PCR methods and applications, 3, 285-291.*
Sabatino et al , Oxepane nucleic acids, 2007, J. Am. Chem. soc. 129, 8259-8270.*
LeProust et al, Characterization of oligodeoxyribonucleotide synthesis on glass plates, 2001, Nucleic Acids Research, 29, 2171-2180.*
Houten et al, Labeling efficiency of oligonucleotides by T4 polynucleotide kinase depends on 5'-nucleosides, 1998, Analytical Biochemistry, 265, 386-389.*
Tian, Jingdong et al., "Accurate multiplex gene synthesis from programmable DNA microchips", Nature, vol. 432, Dec. 23/30, 2004, pp. 1050-1054.

* cited by examiner

*Primary Examiner*—BJ Forman
*Assistant Examiner*—Narayan K Bhat

(57) ABSTRACT

A method for controlling the use of oligonucleotide sequences released from arrays, comprises synthesizing a chemical array of oligonucleotides on a substrate under conditions for producing an array of cleavable oligonucleotides that are blocked from enzymatic reactions after cleavage. Methods may also include receiving a chemical array of cleavable oligonucleotides on a substrate, and cleaving the oligonucleotides from the array, wherein the oligonucleotides are blocked from enzymatic reactions after cleavage. Arrays, populations of oligonucleotides and kits are also provided to facilitate the methods.

26 Claims, 2 Drawing Sheets

CONTROLLING USE OF OLIGONUCLEOTIDE SEQUENCES RELEASED FROM ARRAYS

BACKGROUND

Nucleic acids (DNA and RNA) can be synthesized chemically or enzymatically. Chemical synthesis of nucleic acids can be achieved without a template, i.e., with only the in silico knowledge of the sequence, but the length of the synthesized fragments in practice is limited to about 100 to 200 base pairs due to side reactions (e.g., depurination, branching, etc.) and coupling efficiencies less than 100%. In addition, the end product is a mixture of the intended sequence and of sequences with multiple random deletions. On the other hand, enzymatic synthesis allows generation of long fragments (more than 1000 bases) but requires a template of the sequence to reproduce. The purity is usually high and errors are typically mutations due to the incorporation of the wrong base by the enzyme(s) used.

Recently, considerable interest has been shown in achieving the synthesis of long pieces of nucleic acids without the use of a template, such as in gene synthesis applications. This approach offers the advantages of both chemical and enzymatic synthesis, without the drawbacks of both. For example, Cello, et al., *Science* 2002; 297:1016-18, report that they were able to synthesize long parts of the polio virus without physical access to the natural template, i.e., solely from electronic sequence information and commercially available DNA oligonucleotides. More recently, Church, et al., *Nature* 2004; 432:1050-54, have shown that such gene synthesis was indeed possible using nucleic acids manufactured on a microarray platform.

Cleaving oligonucleotide probes off of an array substrate may facilitate gene synthesis. However, in certain cases, it may be desirable to control the applications to which an array platform is put and to limit the use of an array in gene synthesis reactions. For example, in certain instances, a supplier may desire to provide an array for limited use in particular applications (e.g., such as in diagnostic assays) for which the supplier may be able to provide quality assurances.

SUMMARY OF THE INVENTION

The invention relates to a method that renders both the 3' and 5' ends of released oligonucleotides recovered from microarrays unavailable or unsuitable as substrates for enzymes such as kinases, ligases, phosphatases, polymerases, recombinases and/or exonucleases. In certain aspect, this process inhibits or blocks use of such oligonucleotides in gene synthesis applications.

In one embodiment, the invention relates to a method that comprises synthesizing a chemical array of oligonucleotides on a substrate under conditions for producing an array of cleavable oligonucleotides that are blocked from enzymatic reactions after cleavage. In certain cases, a manufacturer may intend this initial cleavage (e.g., intending to produce a pool of cleaved oligonucleotides having diverse sequences) or the manufacturing process may simply inherently result in an array of oligonucleotides, where the oligonucleotides can be cleaved from the array substrate by a user (e.g., a customer) who receives of the array, irrespective of the manufacturer's intended use of the array.

In one aspect of the invention, the oligonucleotides are synthesized in situ on the substrate. In another aspect, the oligonucleotides are attached to the substrate by a cleavable linker (such as a silanol group). In one aspect, cleavage of the linker produces a blocked group at the cleavage site.

The array substrate can comprise a variety of materials and be in a variety of different configurations. In one aspect, the substrate comprises a planar support. However, in another aspect, the substrate comprises a bead.

In one embodiment, the method further comprises cleaving at least a portion of the oligonucleotides from the array. For example, the portion may be cleaved by exposing the array to altered pH conditions, such as by contacting the array with a base.

In one aspect, the 5' ends of oligonucleotides on the array are exposed and blocked with a blocking group that inhibits an enzyme from binding to or catalyzing a reaction at the 5' ends of the oligonucleotides. For example, the blocking group can comprise a phosphate group such as a 5'-OMe-nucleoside phosphoramidite, which can be incorporated during synthesis of the oligonucleotides on the array resulting in a non-natural nucleic acid residue in the oligonucleotides synthesized.

In another aspect, the 3' ends of the oligonucleotides are exposed on the array and are blocked with a blocking group that inhibits an enzyme from binding to or catalyzing a reaction at the 3' ends of the oligonucleotides.

The enzyme reaction being blocked may include, but is not limited to: a reaction of a kinase, a phosphatase, a polymerase, a nuclease (e.g., such as an exonuclease), a recombinase, a ligase, and combinations thereof.

In certain aspects, the oligonucleotides do not comprise 2'OH groups.

In certain aspects, the oligonucleotides do not comprise deoxyuridine bases.

In certain aspects, the oligonucleotides do not comprise nucleosides that can be cleaved to generate a reactive end for reacting with an enzyme.

In certain aspects, oligonucleotides on the array comprise a cleavage site (e.g., a bond or sequence) for cleaving the oligonucleotides from the array.

In still other aspects, the oligonucleotides do not comprise nucleosides that can be cleaved to generate an end that is reactive with an enzyme, e.g., such as a phosphatase, kinase, ligase, nuclease, polymerase, combinations thereof, and the like.

In still other aspects, the oligonucleotide comprises one or more oligonucleotides proximal to the cleavage site that inhibits the activity of an enzyme that binds at an end generated by cleavage at the cleavage site. For example, the oligonucleotide can include modified nucleotides proximal to the cleavage site that inhibit extension of the oligonucleotide by a polymerase, e.g., when the oligonucleotide hybridizes to another sequence.

In one embodiment, oligonucleotides are cleaved from the substrate and provided to a remote location. For example, cleaved oligonucleotides can be sent to a site that is remote from the site of manufacturing of the array. However, in another aspect, the array is provided to a location remote from the site where the array is manufactured and oligonucleotides are cleaved from the array at the remote site. In still a further embodiment, oligonucleotides are cleaved from an array at a site (e.g., at the manufacturing site) and provided to a remote site.

In another embodiment, the method further comprises cleaving the oligonucleotides and sorting the oligonucleotides according to characteristics of the oligonucleotides.

In certain aspects, the oligonucleotides do not include and are not capable of forming recognition sites for recombinases.

In certain aspects, the cleavage site is located in a constant domain comprising at least one nucleotide or chemical moiety shared in common with all of the cleavable nucleotides on the array. However, in certain other aspects, the oligonucleotides do not comprise constant domains larger than about 5 nucleotides outside of the cleavage site constant domain.

In another embodiment, the invention also relates to a population of oligonucleotides whose ends are blocked from enzymatic reactions. In one aspect, the oligonucleotides of the population each comprise an end immobilized on an array and an end comprising a blocking group which blocks an enzyme from catalyzing a reaction at that end. In another aspect, one end is blocked by a phosphate group, such as a 5'-OMe-nucleoside phosphoramidite. In a further aspect, oligonucleotides of the population comprise an end, which includes a non-nucleotide linker, such as a silanol linker.

In certain aspects, the oligonucleotides lack a sequence capable of forming a restriction enzyme cleavage site.

In certain aspects, the oligonucleotides do not comprise deoxyuridine bases.

In certain aspects, the oligonucleotides do not comprise more than about 5 consecutive identical nucleotides.

In certain aspects, the oligonucleotides do not comprise one or more of: a sequence forming secondary structure, a sequence providing a recognition site for a recombinase, a palindromic sequence, a predefined primer binding site, complementary sequences within a probe, a sequence type repeated in other probes being requested by the user, a vector sequence, a sequence with a predefined level of homology to a predefined sequence, and combinations thereof.

In a further embodiment, the invention also relates to kits. In one aspect, the kit comprises a population of oligonucleotides whose ends are blocked from enzymatic reactions. Each oligonucleotide of the population comprises an end immobilized on an array and an end comprising a blocking group that blocks an enzyme from catalyzing a reaction at that end. In another aspect, one end is blocked by a phosphate group, such as a 5'-OMe-nucleoside phosphoramidite. In a further aspect, oligonucleotides of the population comprise an end that includes a non-nucleotide linker, such as a silanol linker. In another aspect, the kit further comprises a cleavage agent for cleaving at least a portion of the oligonucleotides from the array. In a further aspect, the cleavage agent is an agent for altering pH, such as a base.

In another embodiment, the kit comprises a population of oligonucleotides whose ends are blocked from enzymatic reactions, wherein the population of oligonucleotides is in solution.

BRIEF DESCRIPTION OF THE DRAWINGS

The objects and features of the invention can be better understood with reference to the following detailed description and accompanying drawings. The Figures shown herein are not necessarily drawn to scale, with some components and features being exaggerated for clarity.

DESCRIPTION OF THE INVENTION

Figure 1:
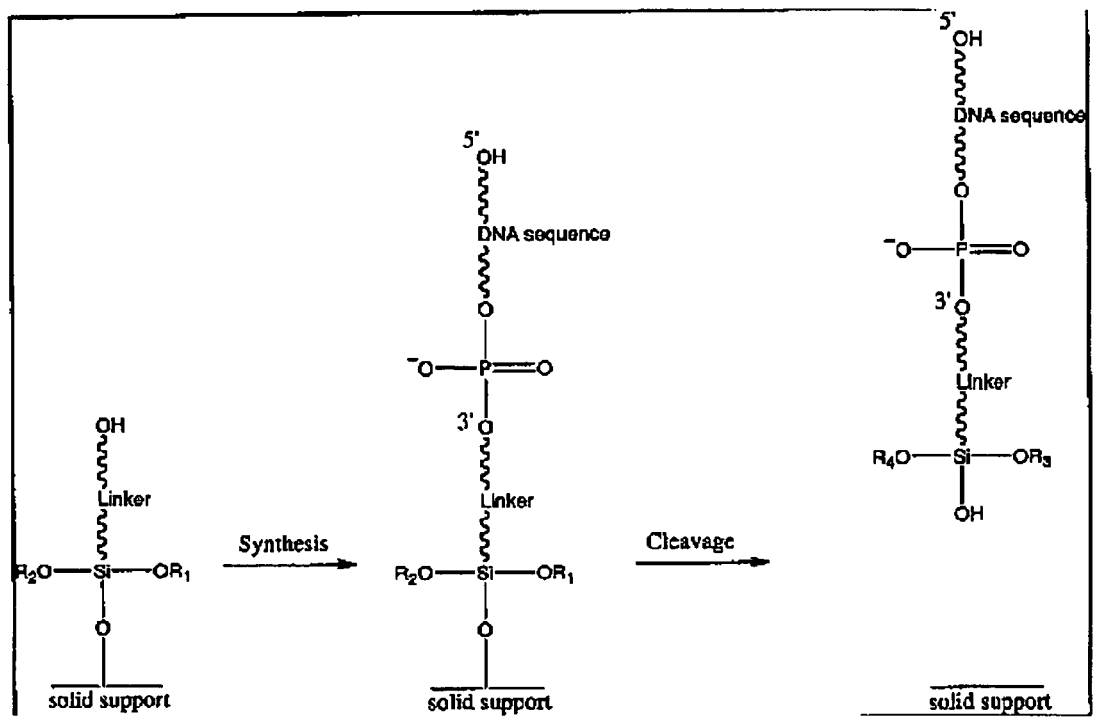
FIG. 1 illustrates a method for in situ synthesis of oligonucleotides on a solid support according to one embodiment of the invention. In one aspect, when no crosslinking of the linker occurs, $R_1$ and $R_2$ are H. In another aspect, where crosslinking does occur $R_3$ and $R_4$ are either $R_1$ and $R_2$ or H.

Before describing the present invention in detail, it is to be understood that this invention is not limited to specific compositions, method steps, or equipment, as such may vary. It is also to be understood that the terminology used herein is for the purpose of describing particular embodiments only, and is not intended to be limiting. Methods recited herein may be carried out in any order of the recited events that is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

Unless defined otherwise below, all technical and scientific terms used herein have the same meaning as commonly understood by one of ordinary skill in the art to which this invention belongs. Still, certain elements are defined herein for the sake of clarity.

All publications mentioned herein are incorporated herein by reference to disclose and describe the methods and/or materials in connection with which the publications are cited.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

It must be noted that, as used in this specification and the appended claims, the singular forms "a", "an" and "the" include plural referents unless the context clearly dictates otherwise. Thus, for example, reference to "a biopolymer" includes more than one biopolymer and the like.

DEFINITIONS

The following definitions are provided for specific terms that are used in the following written description.

A "biopolymer" is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. As such, this term includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. Specifically, a "biopolymer" includes deoxyribonucleic acid or DNA (including cDNA), ribonucleic acid or RNA and oligonucleotides, regardless of the source.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "mRNA" means messenger RNA.

A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. Nucleotide sub-units of deoxyribonucleic acids are deoxyribonucleotides, and nucleotide sub-units of ribonucleic acids are ribonucleotides.

An "oligonucleotide" generally refers to a nucleotide multimer of about 10 to 100 nucleotides in length, while a "polynucleotide" includes a nucleotide multimer having any number of nucleotides.

As used herein, an "end" of an oligonucleotide refers to the terminus of the oligonucleotide, e.g., the last base or last chemical group at the 3' or 5' end of the oligonucleotide.

As used herein, the phrase "synthesized under conditions for producing an array of cleavable oligonucleotides" does not refer to any intent of a manufacturer to produce an array of cleavable oligonucleotides but refers to conditions of synthesis or properties of a synthesized array that enables cleavage of oligonucleotides from the array by the manufacture or a user who receives the array from the manufacturer or some other user of the array. Thus, for example, in certain cases, a manufacturer may intend this initial cleavage (e.g., intending to produce a pool of cleaved oligonucleotides having diverse sequences) or the manufacturing process may simply inherently result in an array of oligonucleotides, where the oligonucleotides can be cleaved from the array substrate by a user (e.g., a customer) who receives of the array, irrespective of the manufacturer's intended use of the array.

As used herein, an end of an oligonucleotide that is "blocked" by a "blocking group" refers to a terminus of an oligonucleotide which comprises a modified or derivatized or analog form of a nucleotide, or which comprises a non-nucleotide chemical group, which renders the end of the oligonucleotide an unsuitable substrate for an enzyme, e.g., prevents an enzyme from binding at, or near the end, and/or prevents an enzyme from catalyzing a reaction at the end (e.g., such as a reaction which adds a nucleotide, adds a phosphate group, removes a phosphate group, breaks a bond proximal to the end of the oligonucleotide, forms a bond at the end of the oligonucleotide, etc.).

A chemical "array", unless a contrary intention appears, includes any one, two or three-dimensional arrangement of addressable regions bearing a particular chemical moiety or moieties (for example, biopolymers such as polynucleotide sequences) associated with that region, where the chemical moiety or moieties are immobilized on the surface in that region. By "immobilized" is meant that the moiety or moieties are stably associated with the substrate surface in the region, such that they do not separate from the region under conditions of using the array, e.g., hybridization and washing and stripping conditions. As is known in the art, the moiety or moieties may be covalently or non-covalently bound to the surface in the region. For example, each region may extend into a third dimension in the case where the substrate is porous while not having any substantial third dimension measurement (thickness) in the case where the substrate is non-porous.

An array may contain more than ten, more than one hundred, more than one thousand more than ten thousand features, or even more than one hundred thousand features, in an area of less than 20 cm$^2$ or even less than 10 cm$^2$. For example, features may have widths (that is, diameter, for a round spot) in the range of from about 10 µm to about 1.0 cm. In other embodiments each feature may have a width in the range of about 1.0 µm to about 1.0 mm, such as from about 5.0 µm to about 500 µm, and including from about 10 µm to about 200 µm. Non-round features may have area ranges equivalent to that of circular features with the foregoing width (diameter) ranges. A given feature is made up of chemical moieties, e.g., nucleic acids, that bind to (e.g., hybridize to) the same target (e.g., target nucleic acid), such that a given feature corresponds to a particular target. At least some, or all, of the features are of different compositions (for example, when any repeats of each feature composition are excluded the remaining features may account for at least 5%, 10%, or 20% of the total number of features).

Interfeature areas will typically (but not essentially) be present which do not carry any polynucleotide. Such interfeature areas typically will be present where the arrays are formed by processes involving drop deposition of reagents but may not be present when, for example, light directed synthesis fabrication processes are used. It will be appreciated though, that the interfeature areas, when present, could be of various sizes and configurations. An array is "addressable" in that it has multiple regions (sometimes referenced as "features" or "spots" of the array) of different moieties (for example, different polynucleotide sequences) such that a region at a particular predetermined location (an "address") on the array will detect a particular target or class of targets (although a feature may incidentally detect non-targets of that feature). The target for which each feature is specific is, in representative embodiments, known. An array feature is generally homogenous in composition and concentration and the features may be separated by intervening spaces (although arrays without such separation can be fabricated).

In the case of an array, the "target" will be referenced as a moiety in a mobile phase (typically fluid), to be detected by probes ("target probes") which are bound to the substrate at the various regions. However, either of the "target" or "target probes" may be the one which is to be detected by the other (thus, either one could be an unknown mixture of polynucleotides to be detected by binding with the other). "Addressable sets of probes" and analogous terms refer to the multiple regions of different moieties supported by or intended to be supported by the array surface.

The term "sample" as used herein relates to a material or mixture of materials, containing one or more components of interest. Samples include, but are not limited to, samples obtained from an organism or from the environment (e.g., a soil sample, water sample, etc.) and may be directly obtained from a source (e.g., such as a biopsy or from a tumor) or indirectly obtained e.g., after culturing and/or one or more processing steps. In one embodiments, samples are a complex mixture of molecules, e.g., comprising at least about 50 different molecules, at least about 100 different molecules, at least about 200 different molecules, at least about 500 different molecules, at least about 1000 different molecules, at least about 5000 different molecules, at least about 10,000 molecules, etc.

The term "genome" refers to all nucleic acid sequences (coding and non-coding) and elements present in any virus, single cell (prokaryote and eukaryote) or each cell type in a metazoan organism. The term genome also applies to any naturally occurring or induced variation of these sequences that may be present in a mutant or disease variant of any virus or cell type. These sequences include, but are not limited to, those involved in the maintenance, replication, segregation, and higher order structures (e.g. folding and compaction of DNA in chromatin and chromosomes), or other functions, if any, of the nucleic acids as well as all the coding regions and their corresponding regulatory elements needed to produce and maintain each particle, cell or cell type in a given organism.

For example, the human genome consists of approximately $3.0 \times 10^9$ base pairs of DNA organized into distinct chromosomes. The genome of a normal diploid somatic human cell consists of 22 pairs of autosomes (chromosomes 1 to 22) and either chromosomes X and Y (males) or a pair of chromosome Xs (female) for a total of 46 chromosomes. A genome of a cancer cell may contain variable numbers of each chromosome in addition to deletions, rearrangements and amplification of any subchromosomal region or DNA sequence. In certain aspects, a "genome" refers to nuclear nucleic acids, excluding mitochondrial nucleic acids; however, in other aspects, the term does not exclude mitochondrial nucleic acids. In still other aspects, the "mitochondrial genome" is used to refer specifically to nucleic acids found in mitochondrial fractions.

By "genomic source" is meant the initial nucleic acids that are used as the original nucleic acid source from which the probe nucleic acids are produced, e.g., as a template in the nucleic acid amplification and/or labeling protocols.

If a surface-bound polynucleotide or probe "corresponds to" a chromosomal region, the polynucleotide usually contains a sequence of nucleic acids that is unique to that chromosomal region. Accordingly, a surface-bound polynucleotide that corresponds to a particular chromosomal region usually specifically hybridizes to a labeled nucleic acid made from that chromosomal region, relative to labeled nucleic acids made from other chromosomal regions.

An "array layout" or "array characteristics", refers to one or more physical, chemical or biological characteristics of the array, such as positioning of some or all the features within the array and on a substrate, one or more feature dimensions, or some indication of an identity or function (for example, chemical or biological) of a moiety at a given location, or how the array should be handled (for example, conditions under which the array is exposed to a sample, or array reading specifications or controls following sample exposure).

The phrase "oligonucleotide bound to a surface of a solid support" or "probe bound to a solid support" or a "target bound to a solid support" refers to an oligonucleotide or mimetic thereof, e.g., PNA, LNA or UNA molecule that is immobilized on a surface of a solid substrate, where the substrate can have a variety of configurations, e.g., a sheet, bead, particle, slide, wafer, web, fiber, tube, capillary, microfluidic channel or reservoir, or other structure. In certain embodiments, the collections of oligonucleotide elements employed herein are present on a surface of the same planar support, e.g., in the form of an array. It should be understood that the terms "probe" and "target" are relative terms and that a molecule considered as a probe in certain assays may function as a target in other assays.

If a surface-bound polynucleotide or probe "corresponds to" a chromosome, the polynucleotide usually contains a sequence of nucleic acids that is unique to that chromosome. Accordingly, a surface-bound polynucleotide that corresponds to a particular chromosome usually specifically hybridizes to a labeled nucleic acid made from that chromosome, relative to labeled nucleic acids made from other chromosomes. Array features, because they usually contain surface-bound polynucleotides, can also correspond to a chromosome.

"Hybridizing" and "binding", with respect to polynucleotides, are used herein interchangeably.

The term "duplex $T_m$" refers to the melting temperature of two oligonucleotides that have formed a duplex structure.

The term "predetermined" refers to an element whose identity or composition is known prior to its use. For example, a "predetermined temperature" is a temperature that is specified as a given temperature prior to use. An element may be known by name, sequence, molecular weight, its function, or any other attribute or identifier. As used herein, "automatic", automatically", or other like term references a process or series of steps that occurs without further intervention by the user, typically as a result of a triggering event provided or performed by the user.

As used herein, the term "signal" refers to the detectable characteristic of a detectable molecule. Exemplary detectable characteristics include, but are not limited to: a change in the light adsorption characteristics of a reaction solution resulting from enzymatic action of an enzyme attached to a labeling probe acting on a substrate; the color or change in color of a dye; fluorescence; phosphorescence; radioactivity; or any other indicia that can be detected and/or quantified by a detection system being used.

A "scan region" refers to a contiguous (preferably, rectangular) area in which the array spots or features of interest, as defined above, are found or detected. Where fluorescent labels are employed, the scan region is that portion of the total area illuminated from which the resulting fluorescence is detected and recorded. Where other detection protocols are employed, the scan region is that portion of the total area queried from which resulting signal is detected and recorded. For the purposes of this invention and with respect to fluorescent detection embodiments, the scan region includes the entire area of the slide scanned in each pass of the lens, between the first feature of interest, and the last feature of interest, even if there exist intervening areas that lack features of interest.

When one item is indicated as being "remote" from another, this descriptor indicates that the two items are in different physical locations, for example, in different buildings, and may be at least about one mile, ten miles, or at least one hundred miles apart. However, in certain aspects, when different items are indicated as being "local" to each other they are not remote from one another (for example, they can be in the same building or the same room of a building). "Communicating", "transmitting" and the like, of information reference conveying data representing information as electrical or optical signals over a suitable communication channel (for example, a private or public network, wired, optical fiber, wireless radio or satellite, or otherwise). Any communication or transmission can be between devices that are local or remote from one another.

"Forwarding" an item or "providing an item" refers to any means of getting that item from one location to the next, whether by physically transporting that item or using other known methods (where that is possible) and includes, at least in the case of data, physically transporting a medium carrying the data or communicating the data over a communication channel (including electrical, optical, or wireless). "Receiving" something or "being provided" something means, an article/composition/manufacture/data is obtained by any possible means, such as delivery of a physical item (for example, an array or array carrying package). When information is received it may be obtained as data as a result of a transmission (such as by electrical or optical signals over any communication channel of a type mentioned herein), or it may be obtained as electrical or optical signals from reading some other medium (such as a magnetic, optical, or solid state storage device) carrying the information. However, when information is received from a communication it is received as a result of a transmission of that information from elsewhere (local or remote).

When two items are "associated" with one another they are provided in such a way that it is apparent one is related to the other such as where one references the other. For example, an array identifier can be associated with an array by being on the array assembly (such as on the substrate or a housing) that carries the array or on or in a package or kit carrying the array assembly. Items of data are "linked" to one another in a memory when a same data input (for example, filename or directory name or search term) retrieves those items (in a same file or not) or an input of one or more of the linked items retrieves one or more of the others. In particular, when an array layout is "linked" with an identifier for that array, then an input of the identifier into a processor which accesses a memory carrying the linked array layout retrieves the array layout for that array.

A "computer", "processor" or "processing unit" are used interchangeably and each references any hardware or hardware/software combination which can control components as required to execute recited steps. For example a computer, processor, or processor unit includes a general purpose digital microprocessor suitably programmed to perform all of the steps required of it, or any hardware or hardware/software combination, which will perform those, or equivalent steps. Programming may be accomplished, for example, from a computer readable medium carrying necessary program code (such as a portable storage medium) or by communication from a remote location (such as through a communication channel).

A "memory" or "memory unit" refers to any device that can store information for retrieval as signals by a processor, and may include magnetic or optical devices (such as a hard disk, floppy disk, CD, or DVD), or solid state memory devices (such as volatile or non-volatile RAM). A memory or memory unit may have more than one physical memory device of the same or different types (for example, a memory may have multiple memory devices such as multiple hard drives or multiple solid state memory devices or some combination of hard drives and solid state memory devices).

An array "assembly" includes a substrate and at least one chemical array on a surface thereof. Array assemblies may include one or more chemical arrays present on a surface of a device that includes a pedestal supporting a plurality of prongs, e.g., one or more chemical arrays present on a surface of one or more prongs of such a device. An assembly may include other features (such as a housing with a chamber from which the substrate sections can be removed). "Array unit" may be used interchangeably with "array assembly".

"Reading" signal data from an array refers to the detection of the signal data (such as by a detector) from the array. This data may be saved in a memory (whether for relatively short or longer terms).

A "package" is one or more items (such as an array assembly optionally with other items) all held together (such as by a common wrapping or protective cover or binding). Normally the common wrapping will also be a protective cover (such as a common wrapping or box), which will provide additional protection to items contained in the package from exposure to the external environment. In the case of just a single array assembly a package may be that array assembly with some protective covering over the array assembly (which protective cover may or may not be an additional part of the array unit itself).

It will also be appreciated that throughout the present application, that words such as "cover", "base" "front", "back", "top", "upper", and "lower" are used in a relative sense only.

"May" refers to optionally.

When two or more items (for example, elements or processes) are referenced by an alternative "or", this indicates that either could be present separately or any combination of them could be present together except where the presence of one necessarily excludes the other or others.

In one embodiment, a method according to the invention comprises synthesizing a chemical array of oligonucleotides under conditions for producing cleaved oligonucleotides that are blocked from subsequent enzymatic reactions, such as reactions by kinases, ligases, phosphatases, polymerases, recombinases and/or exonucleases.

Arrays used in the invention can be provided by any convenient means, including obtaining them from a commercial source or by synthesizing them de novo. To synthesize the arrays employed in the subject methods, the first step is generally to determine the nature of the mixture of cleaved nucleic acids that is to be produced. For example, where the cleaved nucleic acids are to be employed as probes in solution phase diagnostic assays, the sequence of the nucleic acids may be determined by the sequence of particular target molecules such probe nucleic acids are designed to detect. Any convenient method may be employed to determine the sequences of the surface immobilized nucleic acids, including probe design algorithms, including but not limited to those algorithms described in U.S. Pat. No. 6,251,588 and published U.S. Application Nos. 20040101846; 20040101845; 20040086880; 20040009484; 20040002070; 20030162183 and 20030054346; the disclosures of which are herein incorporated by reference. Following identification of the probe sequences as defined above, an array is produced in which each of the probe sequences of the identified or designed set of sequences is present.

In one aspect, as shown in FIG. 1, a solid support, such as glass is reacted with a silanol linker to provide an attachment point for synthesis of an oligonucleotide at a location on the solid support, to thereby form a feature comprising at least one oligonucleotide at the location. For example, a linker can be attached to the support and a chemically active attachment point or functional group (such as a hydroxyl group, for example) can be generated (i.e., generating a functionalized support) for bonding to a deposited monomer. See, e.g., as described in U.S. Pat. No. 6,444,268 and in Southern, E. M., Maskos, U. and Elder, J. K., *Genomics,* 13, 1007-1017, 1992.

An in situ method for fabricating a polynucleotide array using such a functionalized support is typically as follows: at each of the multiple different addresses on a support at which features are to be formed, an iterative sequence is used in forming polynucleotides from nucleoside reagents by means of known chemistry. For example, the following attachment cycle at each feature to be formed can be used multiple times: (a) coupling an activated selected nucleoside (a monomeric unit) through a phosphite linkage to a functionalized support in the first iteration, or a nucleoside bound to the substrate (i.e. the nucleoside-modified substrate) in subsequent iterations; (b) optionally, blocking unreacted hydroxyl groups on the substrate bound nucleoside (sometimes referenced as "capping"); (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The coupling can be performed by depositing drops of an activator and phosphoramidite at the specific desired feature locations for the array. A final deprotection step is provided in which nitrogenous bases and phosphate group are simultaneously deprotected by treatment with ammonium hydroxide and/or methylamine under known conditions.

Capping, oxidation and deprotection can be accomplished by treating the entire substrate ("flooding") with a layer of the appropriate reagent. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in another flooding procedure in a known manner. A single pulse jet or other dispenser can be assigned to deposit a single monomeric unit.

The foregoing chemistry of the synthesis of polynucleotides is described in detail, for example, in Caruthers, *Science* 230: 281-285, 1985; Itakura et al., *Ann. Rev. Biochem.* 53: 323-356; Hunkapillar et al., *Nature* 310: 105-110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, Derivatives", CRC Press, Boca Raton, Fla., pages 100 et seq., U.S. Pat. No. 4,458,066, U.S. Pat. No. 5,153,319, Derivatives", CRC Press, Boca Raton, Fla., pages 100 et seq., U.S. Pat. No. 4,458,066, U.S. Pat. No. 5,869,643, European Patent Application EP 0294196, and elsewhere.

The phosphoramidite and phosphite triester approaches are most broadly used, but other approaches include the phosphodiester approach, the phosphotriester approach and the H-phosphonate approach. Different monomers and activator may be deposited at different addresses on the substrate during any one cycle so that the different features of the completed array will have different desired biopolymer sequences. One or more intermediate further steps may be required in each cycle, such as the conventional oxidation, capping and washing steps in the case of in situ fabrication of polynucleotide arrays (again, these steps may be performed in a flooding procedure). In one aspect, at least one additional step occurs between each cycle, such as oxidation of a phosphate bond to phosphate and deprotection of the 5' (or 3' in a reverse synthesis method) hydroxyl of a nucleoside phosphoramidite deposited and linked in a previous cycle.

The number of nucleic acid features of an array may vary, where the number of features present on the surface of the array may be at least 2, 5, or 10 or more such as at least 20 and including at least 50, where the number may be as high as about 100, as about 500, as about 1000, as about 5000, as about 10000 or higher. In representative embodiments, the subject arrays have a density ranging from about 100 to about 100,000 features/cm2, such as from about 500 to about 20,000 features/cm$^2$, including from about 1000 to about 20,000 features/cm$^2$. In representative embodiments, the density of single-stranded nucleic acids within a given feature is selected to optimize efficiency of the RNA polymerase. In certain of these representative embodiments, the density of the single-stranded nucleic acids may range from about $10^{-3}$ to about 1 pmol/mm$^2$, such as from about $10^{-2}$ to about 0.1 pmol/mm$^2$, including from about $5 \times 10^{-2}$ to about 0.1 pmol/mm$^2$.

Protocols for in situ synthesis protocols may be automated, e.g., by using methods that employ pulse-jet fluid deposition technology in which thermal or piezo pulse jet devices analogous to ink jet printing devices are employed to deposit fluids of biopolymeric precursor molecules, i.e., monomers, onto a surface of an array substrate. Photolabile synthesis methods using masks may also be used. See, e.g., as described in Pirrung, et al., U.S. Pat. No. 5,143,854.

In one embodiment, after manufacturing or after obtaining an array from a manufacturer, the array is subjected to cleavage conditions sufficient to cleave or otherwise release the oligonucleotides of features on the array from the solid support to produce a population of oligonucleotides. In certain aspects, released oligonucleotides are shipped or otherwise provided to a user who is remote from the manufacturing site. In other aspects, the array is shipped and oligonucleotides are released from the array at a site remote from the manufacturing site.

Surface-immobilized oligonucleotides synthesized at features on the array may comprise single-stranded nucleic acids, such as single-stranded deoxyribonucleic acids. In one aspect, such olignucleotides include: (a) a variable domain; and (b) a cleavable domain, where the cleavable domain includes a region (e.g., site or sequence) that is cleavable ("cleavage site"), either when the oligonucleotides are single-stranded or when hybridized to a complementary sequence.

In certain embodiments, a surface immobilized-oligonucleotide on an array employed in the subject methods is described by the following formula:

surface-L-V- wherein:
L is a cleavable domain having a cleavage site; and
V is a variable domain;
where each of the above domains is as described above As indicated above, the single-stranded nucleic acid may be oriented such that either the 3' or 5' end of the molecule is proximal to the substrate surface, e.g., by controlling the synthesis reaction.

The variable domains of oligonucleotides on a precursor array (i.e., an array prior to cleavage) have sequences that are chosen based on the particular application in which the array is to be used, and specifically the intended use of oligonucleotides that are released from the array substrate, e.g., for example, use in diagnostic assays to assay particular genes, RNA products, or combinations of these. The length of the variable domain may vary considerably, and in representative embodiments, ranges from about 10 to about 500 nucleotides (nt), such as from about 15 to about 200 nt and including from about 20 to about 150 nt.

Cleavage of oligonucleotides from an array can be used to produce a plurality of solution phase cleaved oligonucleotides, where each of the different variable domains of the precursor array is represented in the plurality, i.e., for each feature present on the template array, there is at least one oligonucleotide in the plurality that corresponds to the feature.

In one aspect, the plurality of oligonucleotides released from the array have a known composition. By known composition is meant that, because of the way in which the plurality is produced, the sequence of each distinct oligonucleotide in the plurality can be predicted with a high degree of confidence. In many embodiments, the relative amount or copy number of each distinct oligonucleotide of differing sequence in the plurality also is known. For example, the plurality of oligonucleotides may be known to include a constituent oligonucleotide corresponding to each feature of the precursor array used to produce it, such that each feature of the precursor array is represented in the plurality oligonucleotides released from the array.

In certain embodiments, the amount or copy number of each distinct oligonucleotide of differing sequence in the plurality of cleaved oligonucleotide is known. The amounts of each distinct oligonucleotide in the plurality may be equimolar or non-equimolar, and are conveniently chosen and controlled by employing a precursor array with the desired number of features (as well as molecules per feature) for each member of the plurality. For example, where a plurality of cleaved oligonucleotides having equimolar amounts of member oligonucleotides is desired, a precursor array with the same number of features for each member oligonucleotide is employed. Alternatively, where a plurality of cleaved oligonucleotides is desired in which there are twice as many oligonucleotides of a first sequence as compared to a second sequence, a precursor array that has two times as many features of the first sequence as compared to the second sequence may be employed.

The number of different or distinct oligonucleotides of differing sequence present in a plurality of cleaved oligonucleotides can vary, but is generally at least about 2, at least about 5, at least about 10, such as at least about 20, at least about 50, at least about 100 or more, where the number may be as great as about 1000, about 5000 or about 25,000 or greater. Any two given oligonucleotides in the product pluralities are considered distinct or different if they include a stretch of at least 20 nucleotides in length in which the sequence similarity is less then 98%, less than about 80%, less than about 75%, or about 60%, as determined using a suitable program (using default settings) known in the art, e.g., such as FASTA or BLASTN (see, e.g., www.ncbi.nlm.nih.gov for information about default parameters). Alignment may also be performed manually by inspection.

Oligonucleotides released from an array can comprise a heterogeneous mixture or set of individual homogeneous oligonucleotide compositions, depending on intended use.

Populations of oligonucleotides can remain mixed or can be sorted in one or more further processing steps, e.g., such as by binding to complementary nucleic acids bound to a solid support.

In those embodiments where the plurality of oligonucleotides comprise a set of homogenous oligonucleotide populations, the constituent members of the set are, in certain aspects, physically separated, such as present on different locations of a solid support (e.g., of the precursor array), present in different containment structures, and the like. For example, homogeneous populations of oligonucleotides can be synthesized on beads, sorted from each other, before or after synthesis, and/or before or after cleavage. Such beads may optionally be mixed before cleavage. In certain aspects, known ratios of beads may be mixed to provide mixtures of oligonucleotides with known predetermined ratios of oligonucleotide concentrations.

As discussed above, the cleavage region of a cleavable domain can be a site or sequence of an arrayed oligonucleotide. A cleavable domain can comprise a base sequence, an internucleotide bond, a non-nucleotide bond between two non-nucleotide moieties, or bonds between a base residue (or derivative thereof) and a non-nucleotide moiety, e.g., such as a bond between a base residue and a silanol linker. In certain embodiments, the cleavable domain will be the same or identical for all of the surface-immobilized compounds of the array (i.e., L is a constant domain), while in other embodiments, oligonucleotides at a feature, or sets of oligonucleotides at different features (or at different arrays on a multiarray substrate), may have differing cleavable domains.

As discussed above, cleavable regions of cleavable domains may be cleaved by a number of different mechanisms. For example, in certain embodiments, the cleavable domain, and particularly the cleavable region thereof, may be cleaved by light. Photocleavable or photolabile moieties that may be incorporated into the constant domain may include, but are not limited to: o-nitroarylmethine and arylaroylmethine, as well as derivatives thereof, and the like.

Chemically cleavable moieties that may be incorporated into the constant domain may include, but are not limited to: dialkoxysilane, β-cyano ether, amino carbamate, dithoacetal, disulfide, as well as derivatives thereof and the like.

Cleavage of surface-immobilized oligonucleotides at features on the array can be used to produce a solution phase mixture of oligonucleotides. Generally, this step comprises contacting the array with an effective amount of a cleavage agent and/or exposing the array to a suitable cleavage condition. The cleavage agent and/or condition will, necessarily, be chosen in view of the particular nature of the cleavable region of the cleavable domain that is to be cleaved, such that the region is labile with respect to the chosen cleavage agent. Where the cleavable domain comprises a photocleavable or photolabile group, cleavage can be effectuated by subjecting the cleavable domain to light of the appropriate wavelength sufficient to cleave the cleavable region.

Likewise, when the cleavable region comprises one or more chemically cleavable moieties, the array can be contacted with a chemical capable of cleaving the region, e.g., an appropriate acid, base oxidant, or reducer, depending on the nature of the chemically labile moiety. Suitable cleavable sites include, but are not limited to, the following: base-cleavable sites such as esters, particularly succinates (cleavable by, for example, ammonia or trimethylamine), quaternary ammonium salts (cleavable by, for example, diisopropylamine) and urethanes (cleavable by aqueous sodium hydroxide); acid-cleavable sites such as benzyl alcohol derivatives (cleavable using trifluoroacetic acid), teicoplanin aglycone (cleavable by trifluoroacetic acid followed by base), acetals and thioacetals (also cleavable by trifluoroacetic acid), thioethers (cleavable, for example, by HF or cresol) and sulfonyls (cleavable by trifluoromethane sulfonic acid, trifluoroacetic acid, thioanisole, or the like); nucleophile-cleavable sites such as phthalamide (cleavable by substituted hydrazines), esters (cleavable by, for example, aluminum trichloride); and Weinreb amide (cleavable by lithium aluminum hydride); and other types of chemically cleavable sites, including phosphorothioate (cleavable by silver or mercuric ions) and diisopropyldialkoxysilyl (cleavable by fluoride ions). Other cleavable sites will be apparent to those skilled in the art or are described in the pertinent literature and texts (e.g., Brown (1997) Contemporary Organic Synthesis 4(3); 216-237).

FIG. 1 illustrates how oligonucleotides can be released from an array substrate in one embodiment of the invention, using a base, such as ammonia to cleave a cleavage region comprising a bond between a silanol linkage and a nucleotide residue.

In certain embodiments, the invention further provides methods for limiting the uses to which oligonucleotides released from an array are put, for example, where a manufacturer desires to warrant array oligonucleotides for particular uses.

In one embodiment, the invention relates to a method that renders both the 3' and 5' ends of released oligonucleotides recovered from microarrays unavailable or unsuitable as substrates for enzymes, including, but not limited to: kinases, phosphatases, ligases, polymerases, recombinases and nucleases (e.g., such as exonucleases). In certain aspects, this process blocks or inhibits use of such oligonucleotides in gene synthesis applications.

Probe sequences can be rendered unsuitable enzymatic substrates in a number of ways. In one aspect, probe sequences are selected or synthesized which include moieties or modifications that prevent an enzyme from binding to the probe sequence and/or from catalyzing a reaction that involves a probe sequence.

In certain aspects, probe sequences are designed, manufactured, and/or selected which do not contain, or which minimize the formation of, restriction enzyme cleavage sites. For example, in one aspect, in order to render the cleaved nucleic acids unsuitable substrates for enzymatic reactions (e.g., reactions occurring after cleavage), nucleic acid probes are synthesized or selected which do not form regions of secondary structure after cleavage (e.g., such as hairpin configurations, and the like), e.g., to prevent the formation of a restriction enzyme site in such a region. However, in certain aspects, probe sequences include a region for forming a duplex portion under suitable conditions for initial cleavage off the array but are selected to include no other duplex-forming regions after cleavage. Additionally, or alternatively, if the probe does form a hairpin after cleavage involving an end of the probe, formation of the hairpin places the end of the probe proximal to a sequence within the probe which includes non-natural bases which do not base pair with other natural or unnatural bases, such that the probe cannot be extended by a polymerase when hairpin formation occurs.

Additionally, probe sequences are selected that do not form restriction enzyme cleavage sites when hybridized to a complementary sequence on a different molecule. Representations of sequences of oligonucleotides to be synthesized on an array can be screened, e.g., by visual inspection or by a restriction enzyme analysis algorithm (available in programs such as MAP or MAPPLOT from Accelrys, San Diego, Calif.) to select only those probe sequences that would be free of an enzymatic cleavage site. In still other aspects, the probe is designed such that it is incapable of forming a restriction enzyme site even prior to cleavage.

In another aspect, probe sequences are selected in order to render nucleic acids that are cleaved off of an array less likely to form concatamers. For example, probe sequences are selected which comprise nonidentical or non-complementary termini (e.g., the probes comprise stretches of unique sequences of 5 bases or more at their termini). Similarly, while sets of identical probes may be synthesized on an array, repetitive sequences (e.g., sequences of 5 bases or more or their complements that are shared between probes) flanking non-repetitive sequences in a probe are avoided to limit the possibility of recombination that might juxtapose non-repetitive sequences in one probe with non-repetitive sequences of another probe.

Other parameters can be considered in designing, synthesizing, and/or selecting oligonucleotides for use on the array. For example, in certain aspects, oligonucleotides are arrayed which do not incorporate deoxyuridine bases since these might be cleaved enzymatically (e.g., by Uracil-DNA glycosylase (UDG)) to create an active 3' end. In certain aspects, the oligonucleotides do not incorporate natural or modified nucleosides that can be enzymatically or chemically cleaved to create an active end. In still other aspects, the oligonucleotides lack any nucleotides comprising a 2'OH group. For example, in certain aspects, the oligonucleotides lack ribonucleotides. Any or a combination of these approaches can be used.

In certain aspects, oligonucleotides are released from an array substrate by treatment with a base (e.g., such as ammonia) that cleaves the Si—O—Si bond between the linker and substrate surface. This cleavage method provides oligonucleotides that are protected at the 3' end by the linker (e.g., terminated by trisilanol) and that are not protected at the 5' end. The 3' end and the 5' ends can be reversed by using a reverse DNA synthesis method and in a reverse synthesis method it is the 5' end that would be protected.

In certain cases, it may be desirable to cleave oligonucleotides from an array by using light to cleave at photolabile groups. In such cases, probes can be synthesized that include only one site for cleavage proximal to the array substrate surface such that a cleaved oligonucleotide would not serve as a substrate for further enzymatic or light-mediated cleavage reactions, as described above.

Protection of the 5' end is not achieved in the scheme shown in FIG. 1, unless reverse synthesis is used to generate the array. Protection can be achieved by using a number of non-reversible chemical reactions between the 5'OH and a reagent to add a protecting or blocking group to the 5' end of the oligonucleotide or to otherwise modify the 5' end to prevent it from serving as a substrate in an enzymatic reaction. In one aspect, the protecting/blocking group or modification is stable enough such that the group cannot be removed or the modification reverse without damaging the chemical integrity of the oligonucleotide sequence.

Figure 2:
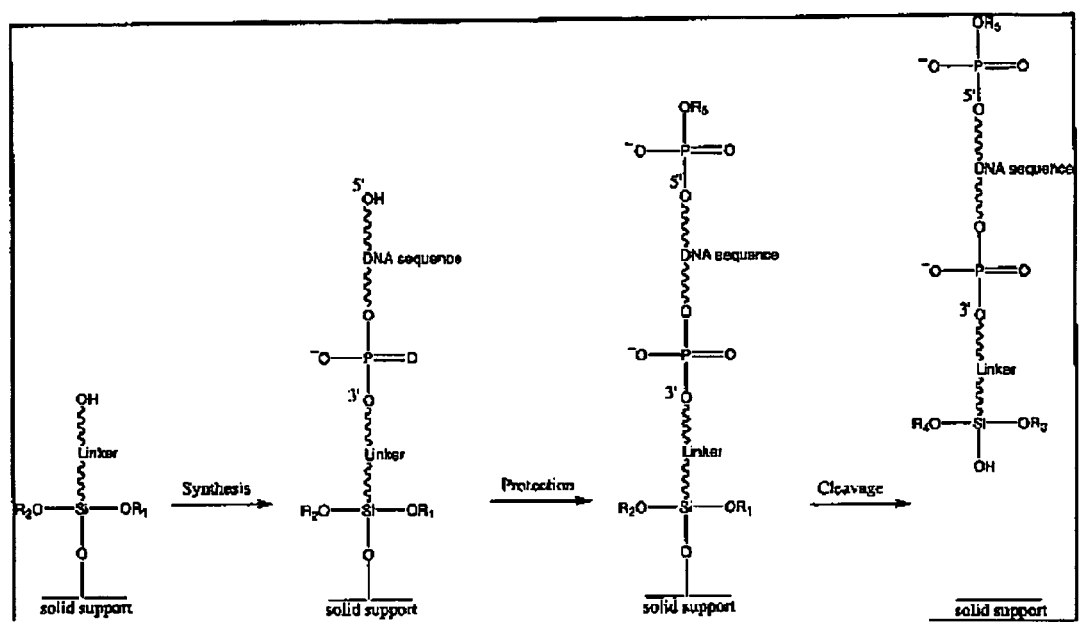
FIG. 2 illustrates a method for in situ synthesis of oligonucleotides on a solid support according to another embodiment of the invention. In one aspect, when no crosslinking of the linker occurs, $R_1$ and $R_2$ are H. In another aspect, where crosslinking does occur $R_3$ and $R_4$ are either $R_1$ and $R_2$ or H. $R_5$ can be any group different from H that does not enable cleaving of the 5' phosphate (for example, no 2' protected OH would be allowed).

FIG. 2 shows one such example where a phosphoramidite reaction is used to incorporate a "capping" phosphate group. In one aspect, the capping phosphate is a non-natural phosphate (i.e., $R_5$ is not H), which cannot be removed enzymatically. In another aspect, $R_5$ is selected to be a moiety which cannot be removed by further chemical reaction (i.e., $R_5$ cannot have a 2' protected OH group and the like). Practical examples of phosphoramidite capping groups include 5'-OMe-nucleoside phosphoramidites. Other modifications or derivatizations of the 5'OH may become obvious in view of the disclosure herein and are encompassed within the scope of the instant invention.

Cleaved nucleic acids which are rendered unsuitable for subsequent enzymatic reactions may be used in such hybridization-based assays as diagnostic assays, synthesis of oligonucleotides (e.g., for therapeutic applications), and library construction through amplification and cloning into vectors. For example, a solution phase mixture of nucleic acids can be contacted with target nucleic acid molecules to form probe: target complexes. In one aspect, the target nucleic acid molecules are themselves immobilized on one or more solid supports, for example, to facilitate characterization of binding pairs or in subsequent sorting reactions.

It is noted that the above reviewed nucleic acid and polypeptide applications are merely representative of the diverse types of applications in which the subject methods find use, and that the subject methods are not limited to use merely in the above representative applications.

In certain embodiments, the subject methods include a step of transmitting data from at least one of the detecting and deriving steps, as described above, to a remote location. By "remote location" is meant a location other than the location at which the array is present and hybridization occur. For example, a remote location could be another location (e.g. office, lab, etc.) in the same city, another location in a different city, another location in a different state, another location in a different country, etc. The data may be transmitted to the remote location for further evaluation and/or use. Any convenient telecommunications means may be employed for transmitting the data, e.g., facsimile, modem, internet, etc.

Kits

Also provided are kits for use in practicing the subject methods. Generally, the kits include a precursor array, as described above, and a cleavage reagent for releasing oligonucleotides from an array. Depending on the particular application in which the kits are to be employed, the kits may further include additional containers, each with one or more of the various reagents (e.g., in concentrated form) utilized in specific applications, including, for example reagents for labeling targets to which the probes are hybridized and the like. In one particular aspect, the array comprises oligonucleotide probes, which are capped or otherwise blocked at their 5' end.

A set of instructions may be included, where the instructions may be associated with a package insert and/or the packaging of the kit or the components thereof. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., diskette, CD, etc., on which the information has been recorded. Yet another means that may be present is a website address which may be used via the internet to access the information at a removed site.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

The invention claimed is:

1. A method comprising:
synthesizing a chemical array of single-stranded oligonucleotides on a substrate, wherein each of said single-stranded oligonucleotides comprises a cleavable linker comprising a silanol, wherein cleavage at said silanol releases the single-stranded oligonucleotides from the array to produce released single-stranded oligonucleotides, wherein both the 3' and 5' ends of all of the released single-stranded oligonucleotides are unsuitable as substrates for enzymatic reactions.

2. The method of claim 1, wherein the single-stranded oligonucleotides are synthesized in situ on the substrate.

3. The method of claim 1, wherein cleavage of the linker produces a blocked group at the cleavage site.

4. The method of claim 1, wherein the substrate comprises a planar support.

5. The method of claim 1, wherein the substrate comprises one or more beads.

6. The method of claim 1, further comprising cleaving at least a portion of the single-stranded oligonucleotides from the array.

7. The method of claim 6, wherein the portion is cleaved by exposing the array to altered pH conditions.

8. The method of claim 7, wherein single-stranded oligonucleotides are cleaved from the substrate by contacting the array with a base.

9. The method of claim 1, wherein 5' ends of the single-stranded oligonucleotides are exposed on the array and are blocked with blocking groups which inhibit an enzyme from binding to or catalyzing a reaction at the 5' ends of the single-stranded oligonucleotides.

10. The method of claim 9, wherein the blocking group comprises a phosphate group.

11. The method of claim 1, wherein 3' ends of the single-stranded oligonucleotides are exposed on the array and are blocked with blocking groups which inhibit an enzyme from binding to or catalyzing a reaction at the 3' ends of the single-stranded oligonucleotides.

12. The method of claim 1, wherein the enzymatic reactions comprise a reaction of a kinase, phosphatase, a polymerase, a nuclease, a recombinase, a ligase or a combination thereof.

13. The method of claim 1, wherein the single-stranded oligonucleotides do not comprise 2'OH groups.

14. The method of claim 1, wherein the single-stranded oligonucleotides do not comprise deoxyuridine bases.

15. The method of claim 1, wherein the single-stranded oligonucleotides do not comprise nucleosides that can be cleaved to generate a reactive end for reacting with an enzyme.

16. The method of claim 1, wherein the single-stranded oligonucleotides do not comprise nucleosides that can be cleaved by a restriction enzyme.

17. The method of claim 1, wherein the single-stranded oligonucleotides are cleaved from the array and provided to a remote location.

18. The method of claim 1, wherein the array is sent to a site that is remote from the site of manufacturing of the array and the single-stranded oligonucleotides are cleaved from the array at the remote site.

19. The method of claim 1, wherein the single-stranded oligonucleotides comprise at least about 10 different sequence single-stranded oligonucleotides.

20. The method of claim 1, further comprising cleaving the single-stranded oligonucleotides and sorting the single-stranded oligonucleotides according to characteristics of the single-stranded oligonucleotides.

21. The method of claim 1, wherein the single-stranded oligonucleotides do not include recognition sites for recombinases.

22. The method of claim 1, wherein the cleavage site is located in a constant domain comprising at least one nucleotide or chemical moiety shared in common with all of the single-stranded oligonucleotides on the array.

23. The method of claim 22, wherein the single-stranded oligonucleotides do not comprise constant domains larger than about 5 nucleotides outside of the cleavage site constant domain.

24. The method of claim 1, wherein the cleavage site comprises a bond between a silanol linker and a nucleotide.

25. A method comprising:
synthesizing a chemical array of single-stranded oligonucleotides on a substrate, wherein each of said single-stranded oligonucleotides comprises a cleavage site, wherein cleavage at said cleavage site releases the single-stranded oligonucleotides from the array, wherein the 5' ends of the single-stranded oligonucleotides are blocked with a blocking group that comprises a 5'-OMe-nucleoside phosphoramidite, and wherein both the 3' and 5' ends of all of the released single-stranded oligonucleotides are unsuitable as substrates for enzymatic reactions.

26. A method comprising receiving a chemical array of cleavable single-stranded oligonucleotides on a substrate, and cleaving the single-stranded oligonucleotides from the array, wherein both the 3' and 5' ends of all the cleaved single-stranded oligonucleotides are blocked from enzymatic reactions after cleavage from the array, wherein said cleavable single-stranded oligonucleotides are attached to said substrate via a cleavable linker that comprises a silanol, and the 5' ends of the cleavable single-stranded oligonucleotides are blocked with a blocking group that comprises a 5'-OMe-nucleotiside phosphoramidite.

* * * * *